Oct. 16, 1923.
J. F. COEUILLE
1,470,912
ELECTRIC SOLDERING IRON
Filed Feb. 21, 1922
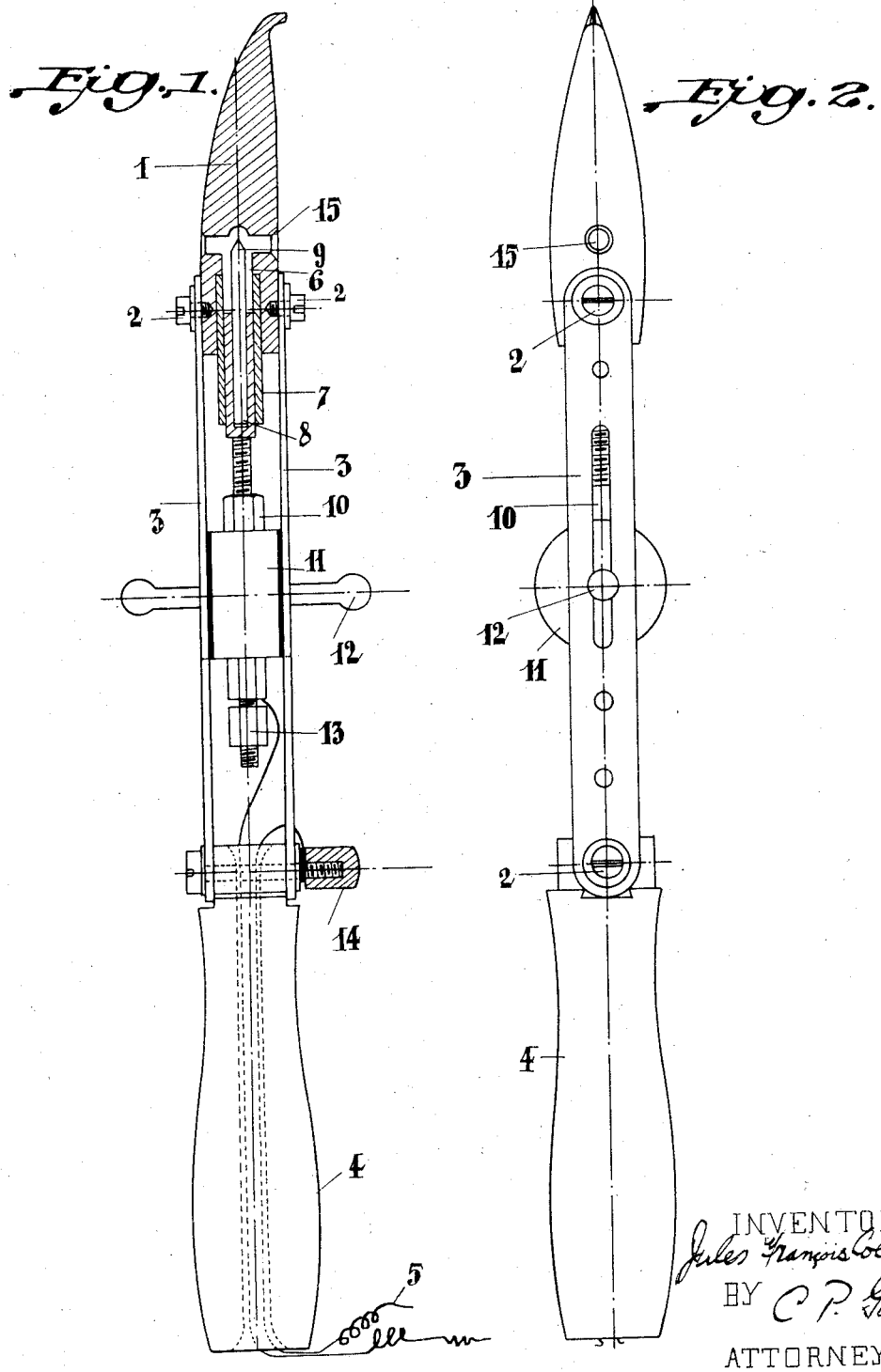

Patented Oct. 16, 1923.

1,470,912

UNITED STATES PATENT OFFICE.

JULES FRANÇOIS COEUILLE, OF PARIS, FRANCE.

ELECTRIC SOLDERING IRON.

Application filed February 21, 1922. Serial No. 538,248.

*To all whom it may concern:*

Be it known that I, JULES FRANÇOIS COEUILLE, a citizen of the Republic of France, and resident of Paris, France (post-office address 7 Rue St. Sebastien), have invented a new and useful Electric Soldering Iron, which improvements are fully set forth in the following specification.

My invention relates to a soldering iron working by means of an enclosed electric arc with current, either direct or alternate, of any power.

To make my invention more clearly understood, I have appended hereto a drawing in which Figure 1 is a plan view of the soldering iron and Figure 2 is a front elevation, parts of the soldering iron being shown in section to illustrate the arrangement of parts.

As will be apparent, said soldering iron is constituted by a suitably shaped copperhead 1, secured by screws 2 or any other means on two cross-ties 3 mounted, properly insulated on a handle 4 made of wood or of insulating material through which passes a current-feed wire 5. Said head 1 is provided with a suitable housing 6, in which is arranged a tube 7 made of quartz or of any other insulating material. Within said tube 7 is adapted to slide a rod 8, carrying a carbon 9. Said carbon-carrier rod 8 is provided at one of its ends with a control screw 10 connecting it with an insulating part 11 made of steatite or of any other suitable material, which part has two studs 12 intended to avoid all risk of burning. Said studs are adapted to move in sideslides made in cross ties 3 and permitting the point of carbon 9 to be adjusted closer to or farther from the soldering head, that is to say, permitting the arc length to be adjusted at will.

One of the current-feed wires is connected to the carbon by a suitable connection 13, while the other wire is connected to the mass by a connection 14. Two side holes 15 made in head 1 allow gases to escape.

My above described soldering iron is ready for use within three miuntes. It is readily adjusted and consumes but a very reduced amount of current while requiring almost no attention since one has but to loosen both screws 2 to change the carbon.

I have disclosed my new invention in its preferred form by the embodiment described above, but I am aware that the principle of construction may be applied to many different forms without deviating from the spirit or sacrificing the advantages of my invention, and any such change embodying this principle will be considered to come within the scope of my invention.

Having now particularly described and ascertained the nature of my said invention as well as the manner in which the same is to be performed, what I claim is:

A soldering iron worked by means of an enclosed electric arc and essentially characterized by the fact that it includes a copper head of variable shape, secured on two cross ties mounted on a suitable handle; said head being provided with a housing in which is arranged a tube made of insulating material; a rod fitted with a carbon and adapted to slide within said tube; said carbon-carrier rod being connected to a part made of insulating material and provided with two studs adapted to move in side slides made in the cross-ties, so as to allow arc adjustment; current feed wires passing through the handle, one of said wires being connected to the mass of the copper head and the other to the carbon by suitable connections; side holes in the copper head permitting escape of gases.

In testimony whereof I have signed this specification in the presence of a subscribing witness.

JULES FRANÇOIS COEUILLE.

Witness:
CHARLES LEON LOISEL.